United States Patent [19]

Evans et al.

[11] 4,010,356
[45] Mar. 1, 1977

[54] TAPE PREPARATION SYSTEM

[75] Inventors: Harvey M. Evans, Escondido; Patrick V. Keene, San Diego, both of Calif.

[73] Assignee: Do All Company, Des Plaines, Ill.

[22] Filed: Oct. 15, 1974

[21] Appl. No.: 514,358

[52] U.S. Cl. .............................. 235/151; 340/172.5
[51] Int. Cl.² .......................................... G06F 3/04
[58] Field of Search ............. 235/151.11, 61.9 R, 235/151.1, 151; 340/172.5

[56] References Cited

UNITED STATES PATENTS

| | | | |
|---|---|---|---|
| 3,573,749 | 4/1969 | Smith | 340/172.5 |
| 3,634,662 | 1/1972 | Slawson | 235/151.11 |
| 3,701,945 | 10/1972 | Gallant et al. | 325/25 |
| 3,783,253 | 1/1974 | Anderson et al. | 235/151.11 |
| 3,821,525 | 6/1974 | Eaton | 235/151.1 |
| 3,829,844 | 8/1974 | Zonneveld et al. | 340/172.5 |

*Primary Examiner*—Eugene G. Botz
*Attorney, Agent, or Firm*—Kirkland & Ellis

[57] ABSTRACT

Disclosed is a tape preparation system for preparing tapes used to operate numerically controlled devices such as machine tools. The preferred embodiment of the system generates punched tapes by visually dislaying and guiding an unskilled operator through the steps necessary for error-free numerical control programming. The system consists of a computer interconnected to a visual display front panel through an interface logic module. A data terminal such as a Teletype ASR 33TY, functions as a tape punch, tape reader, printer and keyboard input console for operator communication with the remainder of the system.

The system computer is programmed to generate data words and address codes corresponding to the locations of a predetermined series of ordinary English messages which are stored in several visual display modules housed in the visual display front panel. At each step of the computer program progression, an ordinary English message is displayed which describes numeric information needed or suggests, by interrogation or command, the next machine instruction which, if appropriate, should at that time be entered in the program for subsequent punched tape recording. The unskilled operator enters needed information and accepts or rejects each suggested instruction by depressing one or more keys of the data terminal whereafter a new message determined by the operator's prior response is displayed. Should the operator define an unusable or redundant instruction an appropriate message is displayed informing the operator that an error has been made.

21 Claims, 13 Drawing Figures

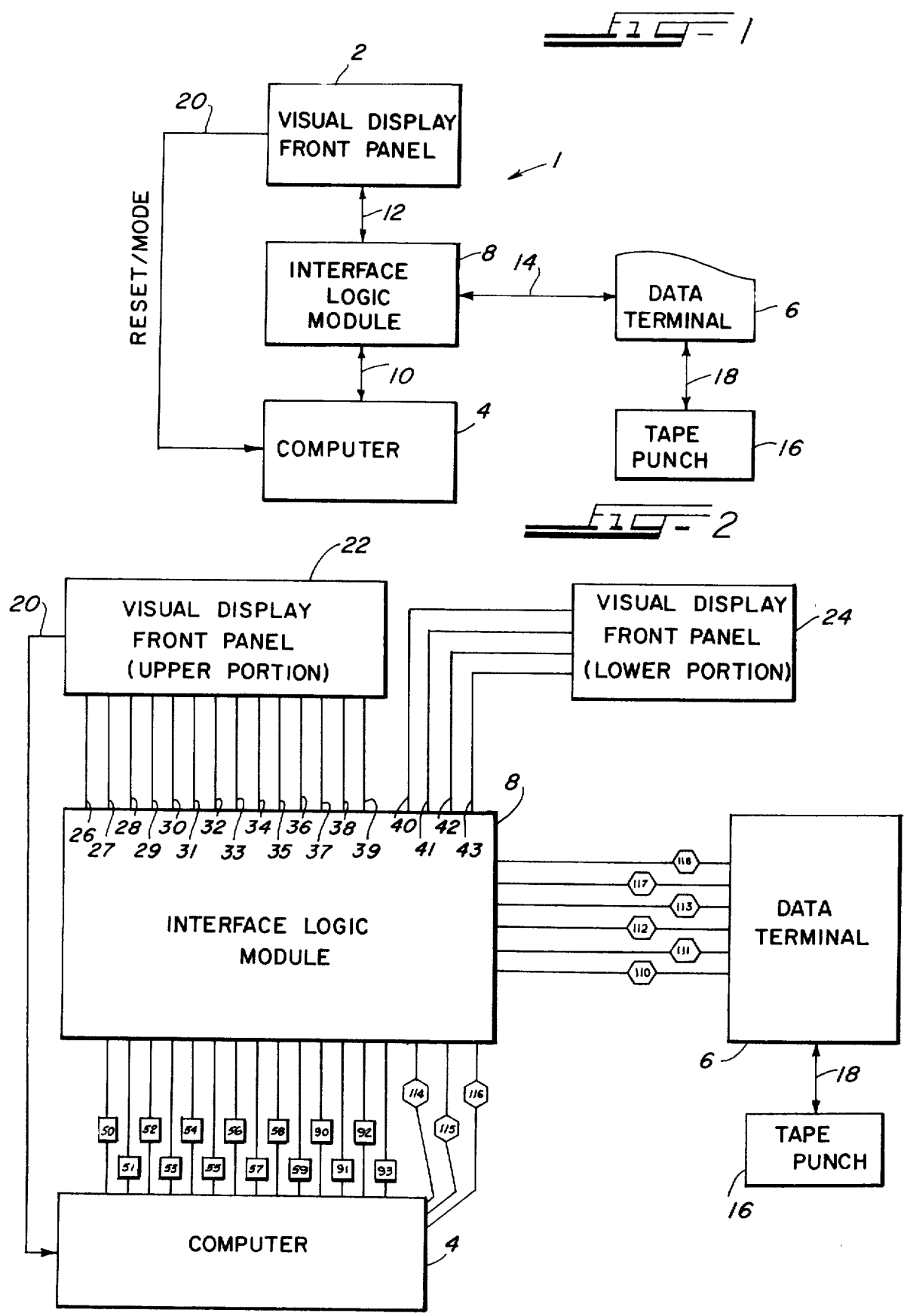

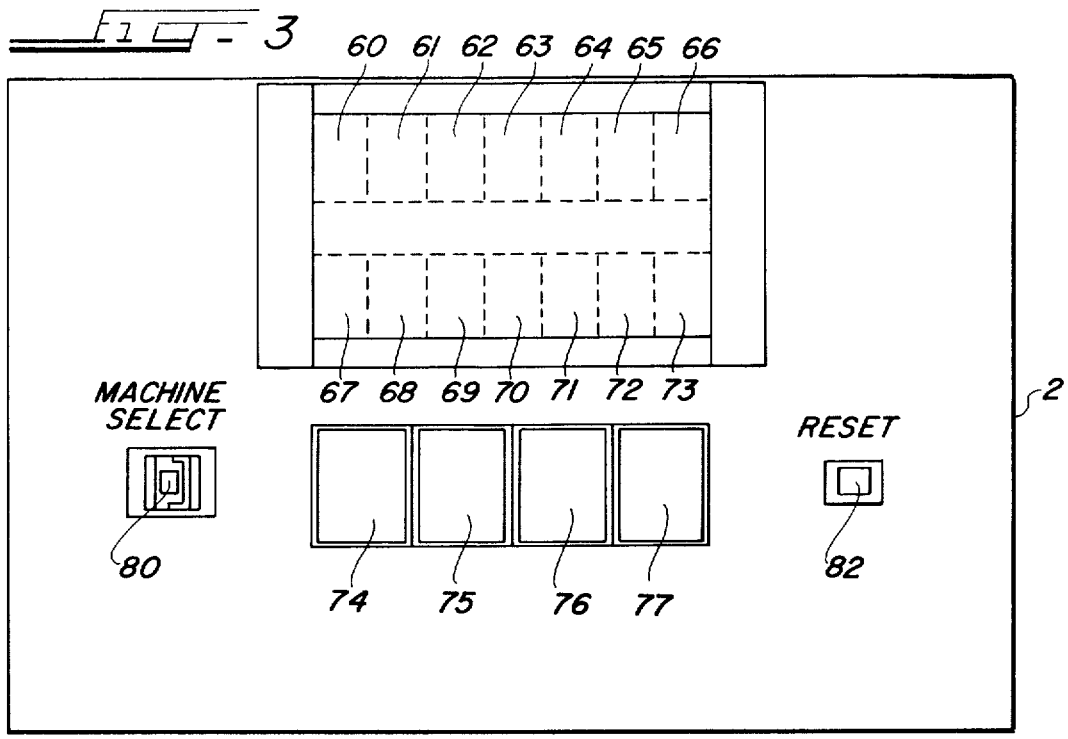
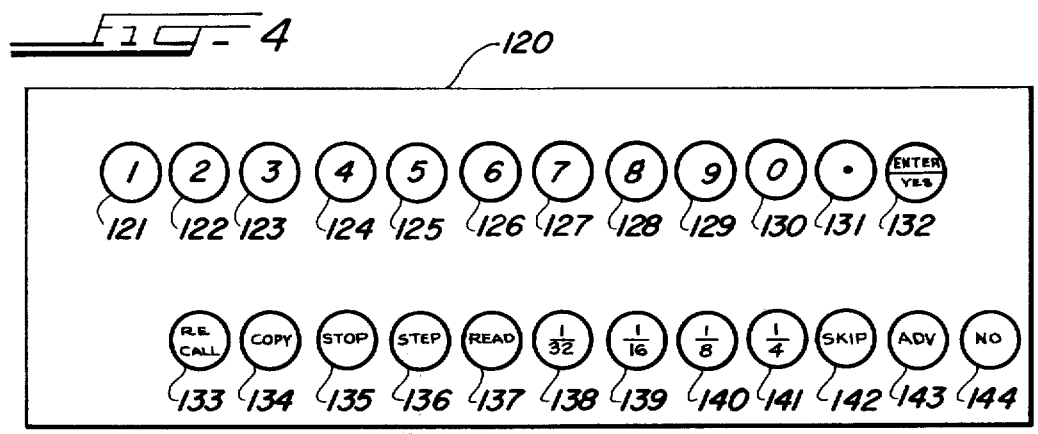
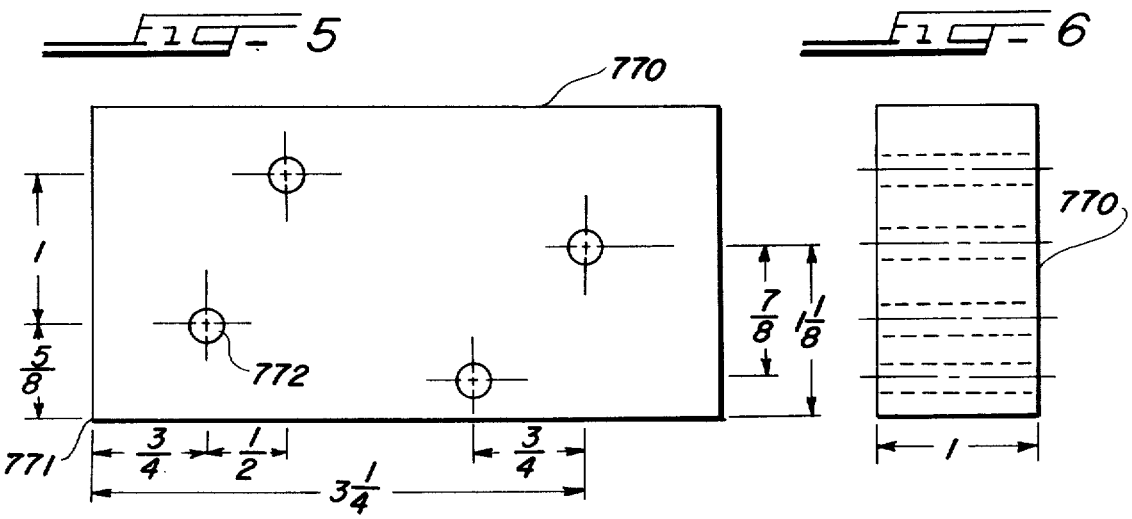

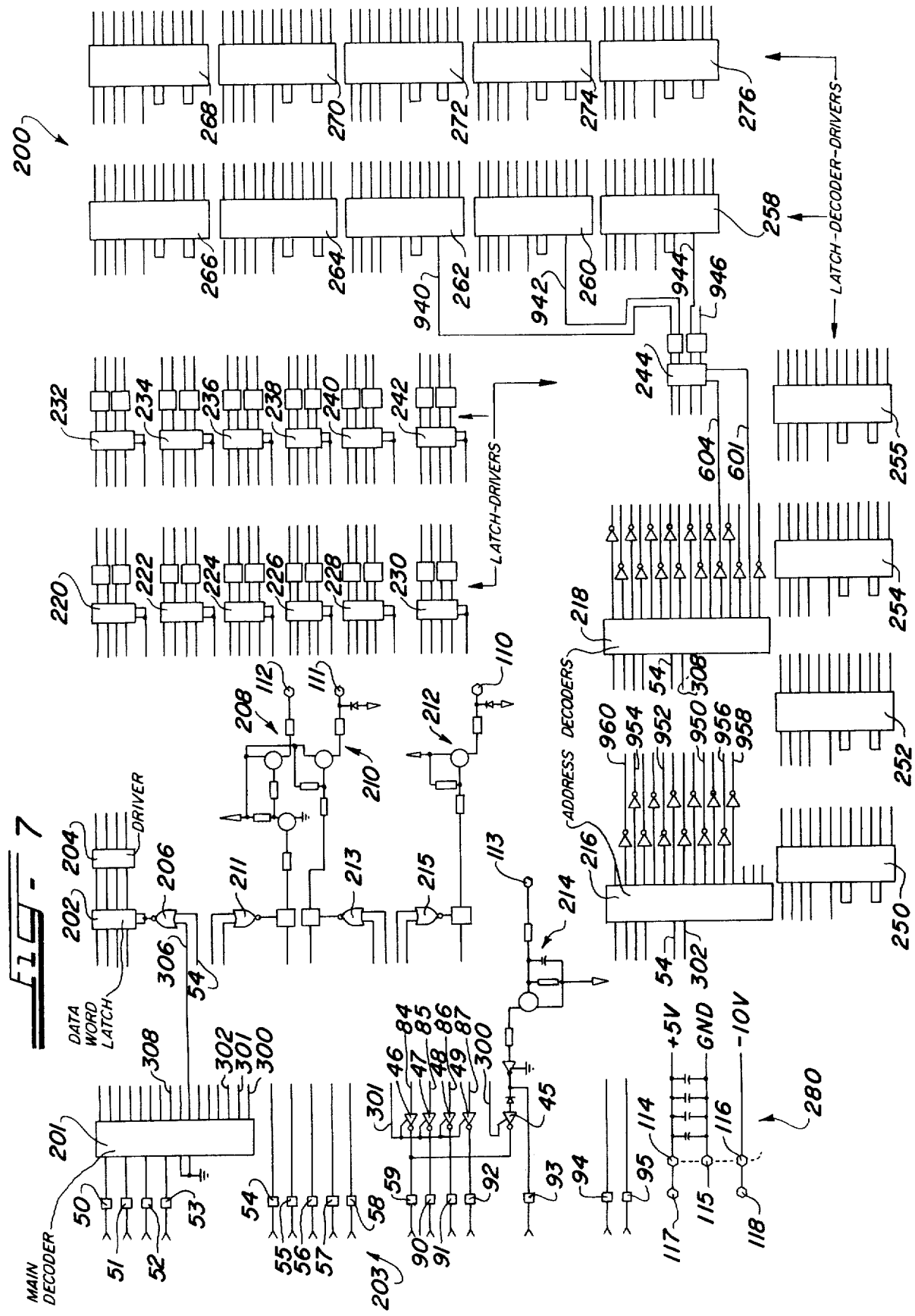

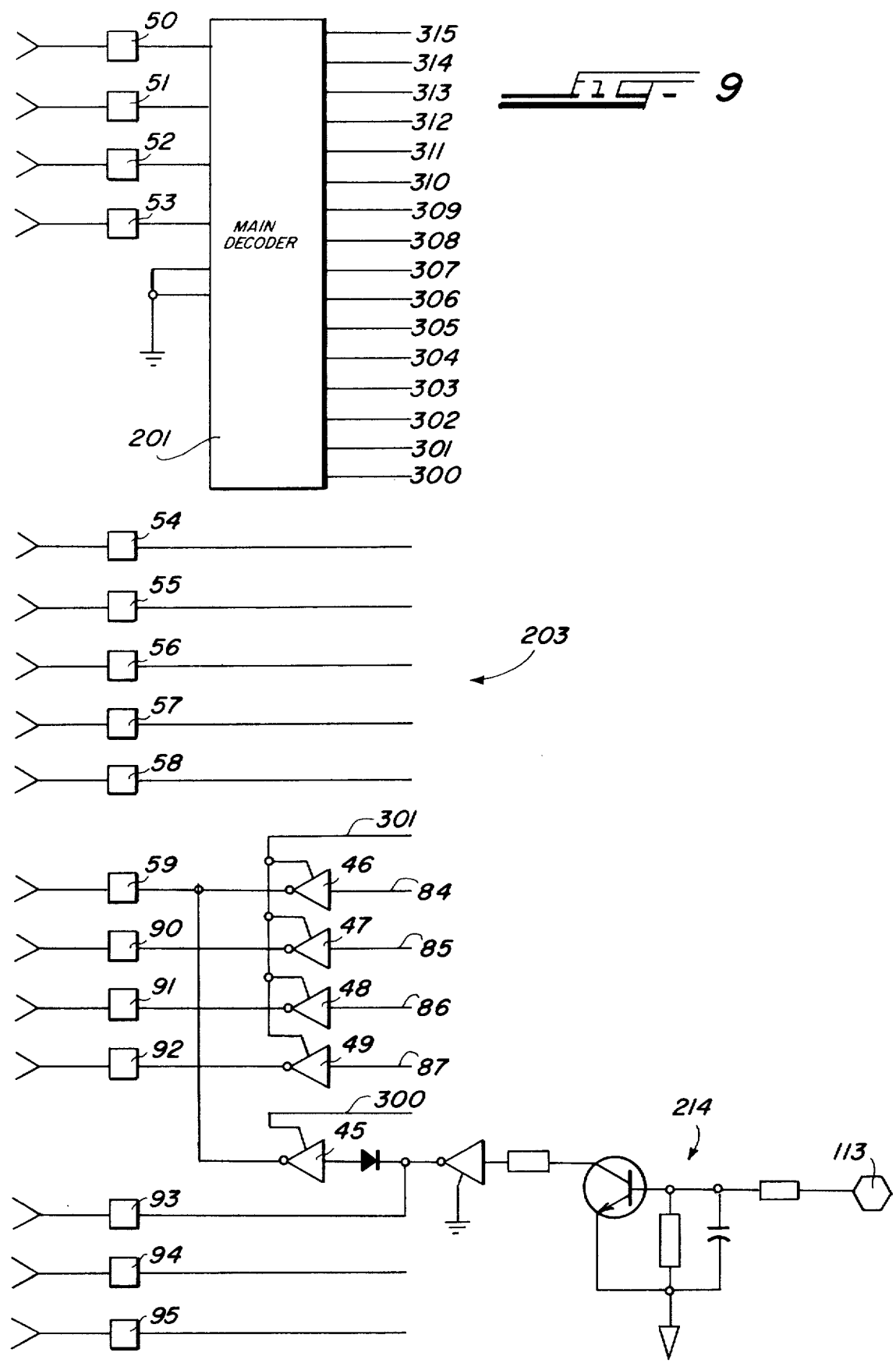

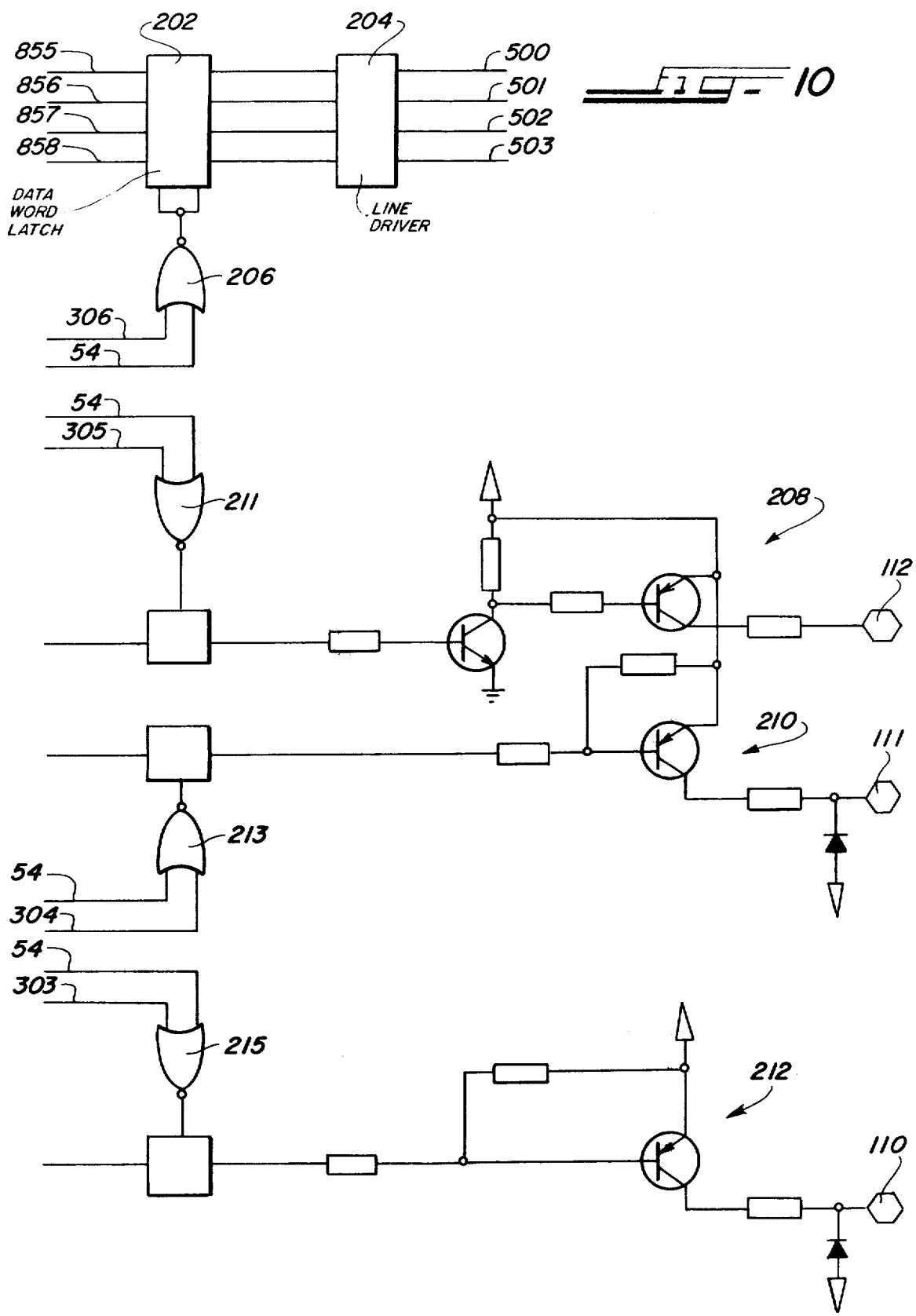

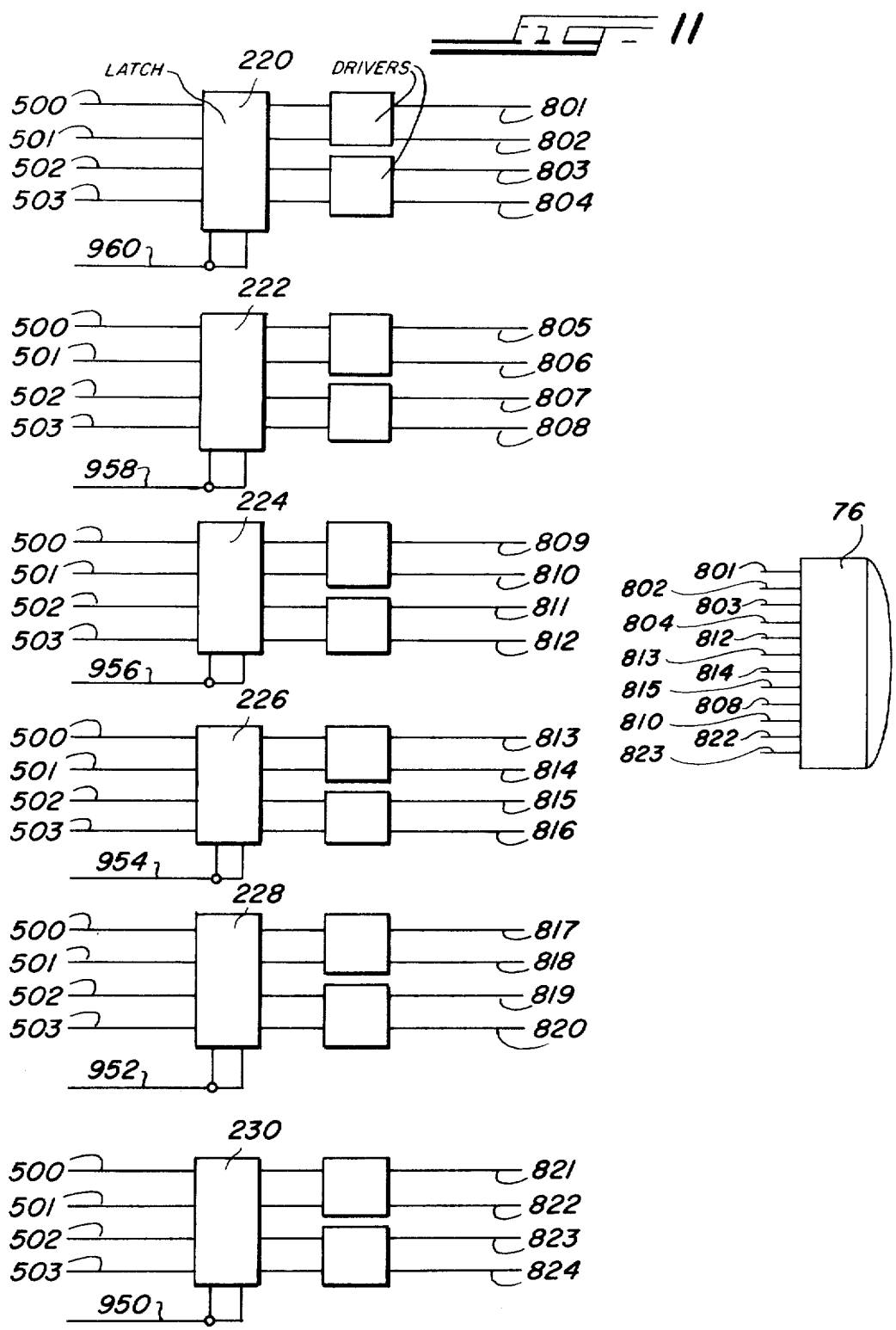

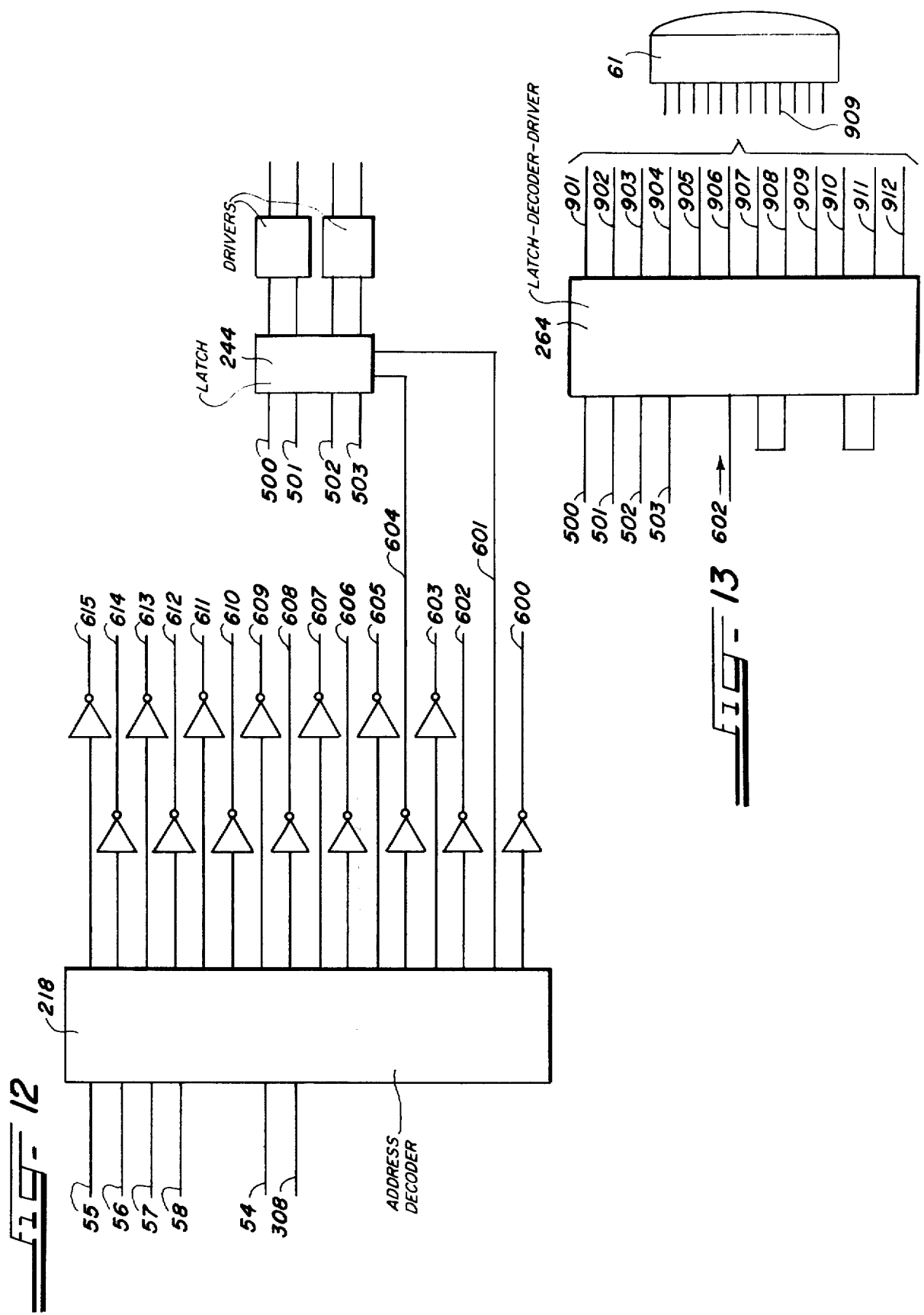

TAPE PREPARATION SYSTEM

BACKGROUND OF THE INVENTION

1. Field of the Invention

The invention relates to a system for the preparation of tapes for control of numerically controlled devices with no direct connection or physical proximity to the device to be controlled by the tape required. More particularly, the invention relates to a system for guiding unskilled operators in the preparation of punched tapes on a system which need not be directly coupled with or in the proximity of the device or devices which the punched tapes are intended to control.

2. Description of the Prior Art

With the current surge in the use of numerical control (N/C), there have been numerous developments intended to simplify the heretofore difficult task of generating a permanent record which, when replayed, will cause the numerically controlled device to repeat the machine operations recorded.

The use of N/C tape control, of course, reduces and in some cases eliminates the need for supervision of machine operation by skilled operators and decreases production time. Thus, the use of N/C tape control serves to speed the manufacturing process and reduce the need for skilled labor, thereby reducing manufacturing costs.

To date, the art of generating control tapes has developed along two distinctly different lines. The first involves the generation of a permanent record, usually a punched tape, during the preparation of a prototype workpiece or first complete machine process. The permanent record thus prepared is subsequently used to drive one or a number of numerically controlled machines in duplicating the recorded steps. The direct coupled control system disclosed in U.S. Pat. No. 3,668,653 — Fair et al. is an example of the first line the art has followed. Among the major drawbacks of such control systems is their prohibitive cost and complexity and the fact that the need for a skilled machine operator is not eliminated, the abilities of a skilled machine operator being necessary during prototype preparation.

The second line that the art of tape preparation has followed involves the generation of control tapes on systems not associated with the device to be controlled by the tape, thus eliminating the need for time consuming preparation of a prototype workpiece or first complete machine process. The system disclosed in U.S. Pat. No. 3,632,989 — Kasischke is typical of the prior art relating to the generation of tapes on systems not directly coupled to the device for which the tape is being prepared. The Kasischke system and similar systems of the prior art obviate the cost and complexity drawbacks of direct coupled tape generating systems but nevertheless require the abilities of skilled programmers or skilled machine tool operators for the preparation of punched tapes.

The present invention obviates the need for skilled programmers and skilled machine tool operators for punched tape preparation by providing a simple, inexpensive system for preparing punched tapes remote from the location of the device to be controlled. Thus, in accordance with the teachings of the present invention, a punched tape or other permanent record for subsequent control use may be generated by a relatively unskilled operator on an inexpensive system remotely located in relation to the device to be controlled by the punched tape generated.

SUMMARY OF THE INVENTION

The tape preparation system of the present development comprises a visual display front panel, a computer encompassing a microprocessor, memory, input/output lines, and a data terminal such as a Teletype ASR 33TY terminal, all cooperatively interconnected through an interface logic module. The visual display front panel is secondarily connected directly to the computer by means of a reset/mode line which bypasses the interface logic module. The system functions to guide one who is unskilled in the art of numerical control (N/C) part programming in the entry of numeric information and in the selection and sequence of machine instructions necessary for the preparation of an error-free tape which may subsequently be used to control a numerically controlled machine tool or other tape operated device.

The system computer is programmed to generate, in appropriate order, 4-bit data words and address codes corresponding to the locations of ordinary English messages describing machine operations or movements of a particular N/C device.

The machine operations or movements are described in ordinary English messages (suggested machine instructions in the form of "commands" or "interrogations") and stored in a series of visual display modules housed in the visual display front panel. The interface logic module circuitry driving each visual display module is assigned an address and each ordinary English message is stored in a numbered location within a visual display module.

As the system computer progresses through its program, a 4-bit data word and an address code corresponding to the locations of a machine instruction is generated at each step and made available to the interface logic module at the computer output lines. The interface logic module decodes each data word and address code, selects the visual display module assigned to the address given by the address code and displays the ordinary English message stored in the numbered location identified by the data word. The message so displayed advises the unskilled operator of the machine instruction which, if appropriate, should be entered in the program at that time. Thus, the unskilled operator is guided by limited choice and suggestion in the selection and sequence of machine instructions and in the input of numeric information. The unskilled operator, with reference where necessary to a blue-print or shop drawing, considers each suggested machine instruction and either accepts or rejects it. The operator accepts or rejects the suggested machine instruction by depressing respectively either the "Enter/Yes" key or the "No" key of the data terminal. Codes representing accepted instructions are temporarily stored in the computer memory and, after responding to suggested instructions corresponding to a complete machine operation or movement, are entered on a punched tape.

In the course of responding to displayed messages, the unskilled operator is informed of errors by means of special messages which are visually displayed on the visual display front panel. Following an error indication, the machine operator is required to repeat the series of steps immediately preceding the erroneous response until an error-free series of machine instructions corresponding to one complete machine operation or movement is generated.

Initial messages displayed by the system suggest machine instructions which define the machine operation. Following definition of the machine operation, the messages displayed suggest machine instructions which define the specifics of that particular machine operation. For example, for the defined operation "drill", the messages following suggest machine instructions such as "tool direction of rotation" and "coolant on". After defining the machine operation and the specifics of the selected operation, the messages displayed solicit numeric information and data such as "hole depth", "feed rate" and "part dimension". The later numeric information is read by the unskilled operator directly from the blue-print or shop drawing and entered by means of the numeric keys of the data terminal keyboard into the system computer.

Following the entry of numeric information and data, the message "record on tape?" is displayed. An "enter-/yes" response to this message results in the automatic entry on punched tape of the coded machine instructions stored in the computer memory.

The foregoing procedure is repeated for each complete machine operation or movement until the program is complete. The tape generated may thereafter by used to cause an N/C machine to repeat the steps hypothetically performed by the unskilled operator under the guidance of a tape preparation system in accordance with the present development.

As stated previously, each computer program is designed for a particular N/C device. To enhance the versitility of the present invention, a mode control and program selection thumbwheel switch (mode switch) is provided on the visual display front panel. The system computer is programmed to generate, in appropriate order, data words and address codes corresponding to machine instructions for up to eight different and distinct N/C devices. Each separate program is assigned a coded address corresponding to one of the numbers appearing on the mode switch. A specific program for a particular N/C device is called out by selectively adjusting the thumbwheel of the mode switch. Thus, the same tape preparation system may be used to generate a punched tape for an N/C wire wrap machine and immediately thereafter, by selecting a different program on the mode switch, used to generate a tape for an N/C milling machine.

It is an object of the present invention to provide an inexpensive and simple system for rapidly preparing a punched tape.

It is a further object of the present invention to provide a system for guiding an unskilled operator in the selection and sequence of machine instructions and in the input of numeric information necessary for a machine operation or movement.

It is yet another object of the present invention to provide a system for identifying errors during programming prior to entry of coded information on a punched tape.

Another object of the present invention is to provide a single tape preparation system capable of generating punched tapes for a multiplicity of different N/C devices.

Other objects and advantages of the present invention will be apparent from the following descriptions and accompanying drawings of the preferred embodiment of the present invention.

BRIEF DESCRIPTION OF THE DRAWINGS

In the Drawings

FIG. 1 is a block diagram representative of the present invention.

FIG. 2 is a detailed block diagram of the FIG. 1 system showing portions of interconnecting busses and component relationships.

FIG. 3 is a front elevation view of the visual display front panel of the present invention.

FIG. 4 is a top plan view of the keyboard of the data terminal of the present invention.

FIG. 5 is a top plan view of an exemplary work piece.

FIG. 6 is a right side elevation view of the exemplary work piece shown in FIG. 5.

FIG. 7 is a circuit diagram of the interface logic module.

FIG. 9 is a schematic diagram of the computer interface circuitry of the interface logic module shown in FIG. 7.

FIG. 10 is a schematic diagram of the main data word latch and line-driver circuitry of the interface logic module shown in FIG. 7.

FIG. 11 is a schematic diagram of a portion of the latch-driver circuitry of the interface logic module shown in FIG. 7 and a schematic representation of one of the display modules of the lower portion of the visual display front panel.

FIG. 12 is a schematic diagram of one of the address decoders of the interface logic module shown in FIG. 7.

FIG. 13 is a schematic diagram of one of the latch-decoder-driver circuits of the interface logic module shown in FIG. 7 and a schematic representation of one of the display modules of the upper portion of the visual display front panel.

DESCRIPTION OF THE PREFERRED EMBODIMENT

Figure 8:
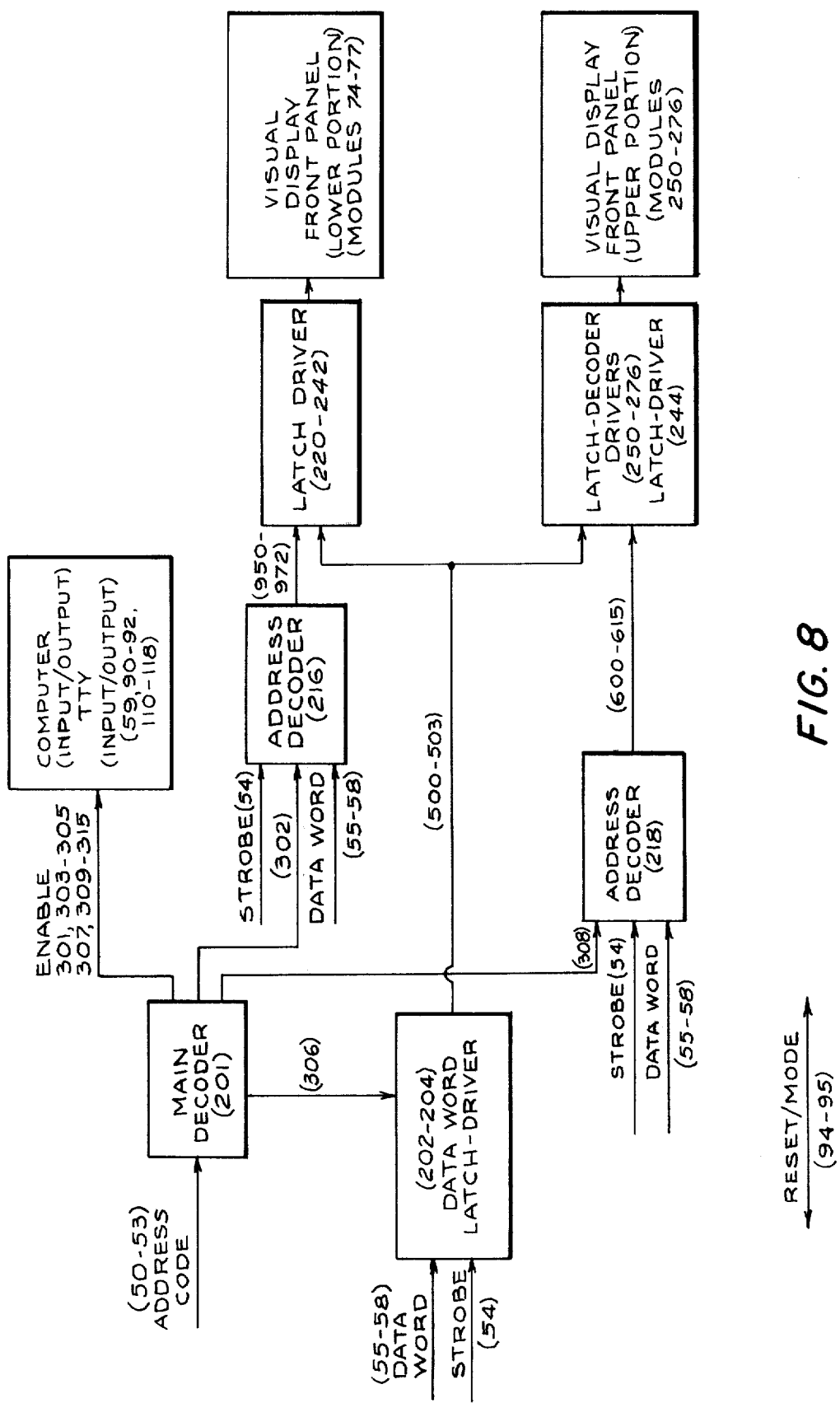
FIG. 8 is a block diagram representation of the circuit diagram shown in FIG. 7.

Referring to FIGS. 1 – 4 and more particularly to FIG. 1, the tape preparation system 1 of the present development comprises visual display front panel 2, computer 4 and data terminal 6, all interconnected through interface logic module 8 by means of interface busses 10, 12 and 14 respectively. Data terminal 6, comprising a substantially conventional data terminal such as a Teletype ASR 33TY terminal, is adapted in the conventional manner to punch tape in the appropriate machine code, and is operably connected for that purpose to tape punch 16 by interface bus 18. Visual display front panel 2 is further connected to computer 4 by reset/mode line 20.

With reference to FIGS. 2 and 3 visual display front panel 2 (FIG. 1) is internally divided into an upper portion 22 which houses visual display modules 60–73 (see FIG. 3) and a lower portion 24 which houses visual display modules 74–77. In addition to visual display modules 60–77, program select and mode control thumbwheel switch (mode switch) 80 and reset button 82 are located on the face 81 of visual display front panel 2.

In the preferred embodiment of the present invention, visual display modules 60–73 are of the rear projection type, Series 1100, and visual display modules 74–77 are of the photographed message type, Series 0280, both manufactured by Industrial Electronics Engineering Inc., 7740 Lemona Avenue, Van Nuys, Cal. 91045. Each visual display module has a twelve message display capacity, each message being called out by a code corresponding to its location among the twelve storage positions.

Interface bus 12 (FIG. 1) comprises display module control cables 26–43. Each of cables 26–43 includes a cluster of twelve wires carrying drive signals from the drive circuitry of interface logic module 8 to one of the visual display modules 60–77 of visual display front panel 2.

Interface bus 10 (FIG. 1) comprises computer input-/output couplings 50–59 and 90–93 (FIG. 2). As will be explained more fully below, 4-bit data words and address codes generated by computer 4 are made available to the interface logic module 8 at output couplings 50–53 and 55–58 with output coupling 54 providing a strobe pulse used for gating purposes. Couplings 59 and 90–92 are input lines to computer 4 and coupling 93 is unused. Reset/mode line 20, comprises interface logic module bypass couplings 94 and 95 (not shown in FIG. 2).

Referring further to FIG. 2, interface bus 14 (FIG. 1) connecting data terminal 6 to interface logic module 8 consists of couplings 110-113 and 117, 118. Couplings 110–113 carry respectively to and from data terminal 6 the signals "printer control", "reader control", "transmit", and "receive". The printer control signal enables and disables the function control and print mechanisms of data terminal 6 in a conventional manner. The reader control signal turns the reader mechanism (not shown) of conventional data terminal 6 "on" and "off". Printer control and reader control signals pass from computer 4 through output circuits 212 and 210 respectively. The transmit signals represent data going through output circuitry 208 of interface logic module 200 (FIG. 7) to data terminal 6 for punching, control or typing and the receive signals represent data coming to computer 4 through input circuitry 214 of interface logic module 200 (FIG. 7) from keyboard 120 (FIG. 4) and the read mechanisms (not shown) of data terminal 6. Output circuits 208-212 connect to computer 4 output coupling 55 and input circuit 214 connects to computer 4 input coupling 59. (FIG. 7). Couplings 117–118 are reference potentials of +5v and 10v respectively to data terminal 6. Lines 114–116 are power supply lines providing the system with potentials respectively of +5v, 0v (Ground), 10v.

With reference to FIG. 4, data terminal keyboard 120 of conventional data terminal 6 is equipped with manually operable input keys 121-144 for operator response to messages displayed on visual display front panel 2 and for entry of numeric data such as tool diameters and part dimensions. Data terminal 6 encodes information and data entered on data terminal keyboard 120 whereafter such coded information and data is transmitted to computer 4 for comparison and computation.

Referring to FIGS. 1 and 2, computer 4 may be any general purpose digital computer which can be programmed in accordance with well known digital programming techniques. In the preferred embodiment of the present invention, computer 4 is a model dd' - 4i MICROCOMPUTER commercially available from Dynamic Data Systems Corp., 533 Stevens Ave., Solana Beach, Cal. 92076. The model dd' - 4i MICROCOMPUTER is a general purpose digital computer with 4-bit data words, 8- and 16-bit instructions and both DATA and PROGRAM memory. The model dd' - 4i is designed to accept "plug in" type printed circuit boards comprising both data and non-volitile program memory modules for custom programming, the number of modules being based on systems requirements. In the present invention, the individual memory modules of computer 4 are custom programmed to generate, in appropriate order, data words and address codes corresponding to the locations of machine instructions for particular N/C devices. In the preferred embodiment up to eight individual programs, each for a particular N/C device, are addressable via mode switch 80 (FIG. 3) which is connected through tristate gates 46–49 to computer 4 by input couplings 59 and 90–92 (FIGS. 7 and 9). Address codes corresponding to individual programs are generated internally in a conventional manner by mode switch 80 which is connected to lines 84–87 (FIGS. 7 and 9). Mode switch 80 address codes are communicated to computer 4 via computer input couplings 59, 90, 91 and 92 when tristate gates 46–49 are enabled by an appropriate signal applied at line 301.

As will be readily apparent to those skilled in the art, the objects, purposes and advantages of the present invention are independent of and not restricted by any particular N/C device program or system computer. General techniques for developing a suitable digital computer program for use in the present invention are well known. (see for example and reference: Maley, Gerald A., THE LOGIC DESIGN OF TRANSISTOR DIGITAL COMPUTERS, Prentice-Hall, (1963).

With reference to FIG. 2, computer 4, programmed for a particular N/C device, advances step-by-step through its program, stopping at each step to generate a 4-bit data word and an address code corresponding to the location of a machine instruction which, if appropriate, should be entered in the N/C punched tape program at that point. The 4-bit data word is placed (one bit per line) on computer 4 output control lines 55–58. An address code is placed (one bit per line) on computer output control lines 50–53. Both the data word and the address codes are binary in accordance with the following chart:

| Binary Code | Numeric Equivalent |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |
| 1110 | 14 |
| 1111 | 15 |

As will be explained more fully with reference to the operation of interface logic module 8, the address code and the data word appearing respectively on computer output lines 50–53 and 55–58 are presented at the input of interface logic module 8 which decodes the data word and the address code and causes visual display front panel 2 to display an ordinary English message describing the machine instruction or data indicated as timely by the operable program of computer 4.

To proceed with the preparation of a tape in accordance with the present invention, the unskilled operator is called upon the enter the necessary data or to accept or reject the machine instruction suggested by the message displayed. The operator response, depressing either Enter/Yes key 132 or No key 144 of data terminal keyboard 120 (FIG. 4), determines the subsequent program path followed by computer 4. If Enter/Yes key 132 is depressed, the message displayed is extinguished and the machine instruction corresponding to that message is entered in coded form in the computer memory. The next message called out and displayed by computer 4 is related to the previously selected machine instruction. If, instead of depressing Enter/Yes key 132, the operator had depressed No key 144, the message displayed would have been extinguished and computer 4 would have progressed to the next machine instruction of its program, path unchanged. Operator response are received by computer 4 as receive signals on input coupling 113 (FIGS. 2 and 7) and enable continuation of the program progression.

Actual machine instructions are generated and coded internally by computer 4. An affirmative response to an ordinary English message suggesting a machine instruction merely affects the internal computer 4 operation of shifting the coded actual machine instruction from a working register to a storage register in the data memory of computer 4 where the instruction is held until called for entry on the punched tape.

Initial messages called out by computer 4 suggest alternative machine operations such as "Drill?", "Bore?", and "Tap?". Following selection of the machine operation, the displayed messages relate to machine set up instructions such as direction of rotation and coolant on or off. During program development, numeric information and data such as part dimensions, and tool diameters are solicited as necessary and entered into the system by selective depression of numeric keys 121-131.

Computer 4 continues to accumulate accepted machine instructions and data in its memory until output coupling 112 is enabled, allowing transmit signals corresponding to coded actual machine instructions to pass from the memory of computer 4 through interface logic module 8 to data terminal 6 for entry on punched tape via tape punch 16.

The model dd' - 4i MICROCOMPUTER is equipped with a "reset" control. Depression of reset button 82 (FIG. 3) provides an appropriate signal along computer input couplings 94 and 95 (FIGS. 7 and 9) which clears the data memory of computer 4 and starts anew the operable program. "Systems test", a separate mode of computer 4, is initiated by adjusting mode switch 80 (FIG. 3) to "0" and depressing reset button 82. In the systems test mode, repeated depression of ADV (advance) key 143 (FIG. 4) causes computer 4 to generate sequential data words and address codes and consequently to sequentially display every message stored within visual display modules 60-77 of visual display front panel 2 (FIG. 3). This procedure allows immediate verification of appropriate system and equipment operation.

With reference to FIG. 7, interface logic module 200, shown as block diagram 8 in FIGS. 1 and 2, comprises on the input side 203 (shown also in FIG. 9), "1 of 16" main decoder 201, computer 4 input/output couplings 50-59 and 90-95 (the numbering of interface bus lines is maintained constant throughout in the interest of clarity and to facilitate placement of common elements in relation to the total system). Interface logic module 200 further comprises, data word latch 202, line driver 204 and "nor" gate 206 along with computer-data terminal communication links 208, 210, 212, 214 and mode switch input lines 84-87. The operation of links 208, 210 and 212 is controlled respectively by nor gates 211, 213 and 215. The operation of link 214 and mode switch input lines 84-87 are controlled respectively by tristate gate 45 and tristate gates 46-49. Also included within interface logic module 200 are address decoders 216 and 218, latch-drivers 220-244, latch-decoder-drivers 250-276, and system power supply 280.

Referring to FIG. 7, the operation of the primary elements of interface logic module 200 including data word latch 202, and address decoders 216 and 218 as well as nor gates 206, 211, 213, 215 and tristate gates 45-49 is controlled by computer 4 through the selective addressing function of main decoder 201 (See also FIGS. 9-13). The output line of main decoder 201 (FIG. 9) which corresponds to the primary element of interface logic module 200 controlling the operation to be performed is addressed for enabling purposes by a binary signal applied by computer 4 on main decoder 201 input lines 50, 51, 52 and 53. Each of the operations of interface logic module 200 is either directly or indirectly controlled by the addressing function of main decoder 201. For example, to enable data word latch 202, output line 306 of main decoder 201 which corresponds to input 306 of nor gate 206 must be addressed by a binary signal applied at couplings 50, 51, 52 and 53. To address line 306, the sixth output of main decoder 201, the binary signal 0110 which is equivalent to numeric 6 is applied at couplings 50, 51, 52 and 53. Similarly, to enable the addressing function of address decoder 218 (FIG. 12), line 308 (the output) of main decoder 201 is addressed by applying the binary signal 1000 at the input of main decoder 201.

In a similar manner, computer 4, through main decoder 201, selectively controls signals from mode switch 80, and communication to and from data terminal 6. All operations of interface logic module 200, including those of address decoders 216 and 218, are kept distinct from each other by the mutually exclusive addressing functions of main decoder 201.

Address decoders 216 and 218, which control operation respectively of latch-drivers 220-242 and of latchdecoder drivers 250-276 and latch-driver 244, operate in a manner somewhat analogous to that of main decoder 201. Latch-drivers 220-242 are each assigned to distinct address and are selectively enabled by address decoder 216. Similarly, latch-decoder-drivers 250-276 and latch-driver 244 are each assigned a distinct address and are selectively enabled by address decoder 218. The appropriate coded address corresponding to the latch-driver or latch-decoder-driver selected for operation by computer 4 is placed on computer output lines 55, 56, 57 and 58. Lines 55, 56, 57 and 58 are connected internally to the input lines or both address decoders 216 and 218. A given latch-driver is selected by enabling address decoder 216 through main decoder 201 which activates line 302. With line 302 activated, address decoder 216 is strobed by computer output strobe coupling 54. This addressed latch-driver is enabled when the output line of address decoder 216 connected to it is activated.

As previously stated, each of visual display modules 60–77 has a twelve message storage capacity. In the preferred embodiment of the present invention, each of latch-drivers 220–242 controls the operation of four message storage locations within visual display modules 74–77. Latch-decoder-drivers 250–276 each control the twelve message storage locations of one of visual display modules 60–73. The outputs of all latch-drivers and latch-decoder-drivers are connected directly to the inputs of their corresponding visual display module message storage locations.

TABLE 1 below illustrates the address assignments for latch-decoder-drivers 250–276 and latch-driver 244. The correspondence between latch-decoder-drivers 250–276, latch-driver 244 and visual display modules 60–73 is also shown along with the uninverted computer output required for addressing purposes.

TABLE 1

| Binary Address | Latch-decoder-drivers Fig. 7 Ref. No. | Reg'd. Computer 4 Output | Corresponding Visual Display Module (Fig. 3 Ref. No.) |
|---|---|---|---|
| 0001 | 266 | 1110 | 60 |
| 0010 | 264 | 1101 | 61 |
| 0011 | 262 | 1100 | 62 |
| 0100 | 260 | 1011 | 63 |
| 0101 | 258 | 1010 | 64 |
| 0110 | 268 | 1001 | 65 |
| 0111 | 250 | 1000 | 66 |
| 1000 | 272 | 0111 | 68 |
| 1001 | 274 | 0110 | 69 |
| 1010 | 256 | 0101 | 71 |
| 1011 | 244 | 0100 | 62,63,64 |
| 1100 | 276 | 0011 | 70 |
| 1101 | 254 | 0010 | 72 |
| 1110 | 244 | 0001 | 62,63,64 |
| 1111 | 270 | 0000 | 67 |
| 0000 | 252 | 1111 | 73 |

Referring to FIG. 13, visual display module 61, like visual display modules 60, and 62–77, has twelve input lines corresponding to its twelve message storage locations. The twelve input lines of visual display modules 6–77 are connected directly to the output line of the driver circuitry of interface logic module 200 (see Table 1 for latch-decoder-drivers 250–276) which drives the respective twelve message storage locations. In the case of latch-decoder-drivers 250–276, the particular message storage location (1 through 12) is determined by the numeric equivalent of the binary data word placed on input lines 500, 501, 502 and 503 (FIG. 13). The common input lines of latch-drivers 220–244 and latch-decoder-drivers 250–276 are all internally connected to the output lines 500, 501, 502 and 503 of line driver 204 (FIG. 7). The data word appearing at the output of line driver 204 is the inverse of the data word applied at lines 855, 856, 857 and 858 of data word latch 202. (FIG. 10) The input lines of data word latch 202 are connected directly to computer output couplings 55, 56, 57 and 58. Accordingly, the message storage location to be displayed is determined by the data word placed by computer 4 at its output couplings 55, 56, 57 and 58. This data word is inverted and latched at the output of line driver 204 by activation of line 306 of main decoder 201 in the manner previously described. Thue each ordinary English message stored within visual display modules 60–73 is identifiable by an address code which identifies a particular latch-decoder-driver along with its associated visual display module, and a data word which identifies the message storage location within the module identified.

With reference to FIGS. 7, 8, 9 and 10 the message displaying operation of interface logic module 200 functions as follows. A 4-bit data word from computer 4 (not shown) is placed on computer output couplings 55–58 and at the input lines 855, 856, 857 and 858 of data word latch 202 which are internally connected to lines 55, 56, 57 and 58. An address code is placed on computer output control lines 50–53 at the input of main decoder 201 which decodes the address and enables line 306 of nor gate 206. Thereafter computer strobe coupling 54 is activated (driven low) causing the output of nor gate 206 to go high thereby latching on output lines 500, 501, 502 and 503 of line driver 204 the inverse of the data word on lines 855, 856, 857 and 858.

The data word at output lines 500, 501, 502 and 503 is simultaneously presented at the input of all latches since the output lines 500, 501, 502 and 503 of line driver 204 are internally connected to the inputs of latch-drivers 220–244 and latch-decoder-drivers 250–276. An address code (0010 or 1000) indicating whether decoder 216 (code 0010) or decoder 218 (code 1000) is to be strobed is placed on the input of main decoder 201. The address of the latch to be strobed is placed on computer couplings 55–58 and simultaneously at the input lines of both decoders 216 and 218. Computer output strobe coupling 54 is activated and either decoder 216 or 218 is enabled depending on whether the address input to main decoder 201 was 0010 or 1000. The message at the selected address is displayed by the latch addressed.

Messages displayed are extinguished by repeating the above-described procedure with the data word 1111 latched at the input of latch-decoder-driver controlling the message to be extinguished. Referring to FIGS. 7 and 13, it will be apparent to those skilled in the art that, with the exception of the decimal point capability of latch-decoder-drivers 262, 260 and 258, one and only one message at a time may be displayed on visual display modules 60–73. Latch-drivers 220–242 differ somewhat in their operation from latch-decoder-drivers 250–276 and therefore, one or more of the message storage locations of visual display modules 74–77 may be displayed simultaneously.

Referring to FIG. 11, the input lines of latch-drivers 220–230 and 232–244 (the later now shown in FIG. 11), as explained above are connected internally directly to the output lines 500, 501, 502 and 503 of line driver 204 (FIG. 7) and accordingly are given the same number designations. The output lines of latch-drivers 220–244, when enabled, "latch" on, and assume directly, the code designation applied at their respective inputs. For example, if the data word 0111 is applied on lines 500, 501, 502, 503 and latch-driver 220 is enabled, the data word 0111 is latched on output lines 801, 802, 803 and 804. The effect of latching the data word 0111 on the output lines of latch-driver 220 is to display the ordinary English messages stored in the message storage locations of visual display module 76 corresponding to lines 802, 803 and 804. It is therefore possible, by sequential selection of more than one of latch-drivers 220–242 and application of appropriate data words on lines 500, 501, 502 and 503 to display all messages within one or more of visual display modules 74–77. The display mechanisms of visual display modules 74–77 of the preferred embodiment, direct the display of certain messages to different locations on the visual display module window, thereby facilitating the display of more than one message. Messages displayed on visual display modules 74–77 are extinguished by applying data word 1111 at the input of data word latch 202 which results, when data word decoder 202 is enabled, in the data word 0000 on lines 500, 501, 502 and 503 at the inputs of latch-drivers 220–244. The data word 0000 extinguishes the messages displayed by all latch-drivers thereafter enabled.

From the foregoing discussion, it will be apparent to those skilled in the art that the unique design of interface logic module 200 makes possible the display of any message or numeric representation stored in visual display front panel 2 (FIGS. 1–3).

To illustrate the message displaying operation of interface logic module 200 by example, assume the operable program of computer 4 determines the ordinary English message held in the ninth position of visual display module 61 (FIG. 3) should be displayed. Since the selected message is located at position nine (binary 1001), the data word supplied by computer 4 at computer output couplings 55, 56, 57 and 58 is 0110 (the inverse of 1001). The data word 0110, in accordance with the foregoing discussion, is also applied at data word latch 202 input lines 855, 856, 857 and 858. With 0110 applied at the input of data word latch 202, data word latch 202 is enabled and the appropriate message location 1001 is latched at the input of all latches.

With reference to FIG. 9, the output lines 300–315 of main decoder 201 are "high" with no output on computer output couplings 50–53. Output 306 of main decoder 201 is connected directly to nor gate 206 FIGS. 7 and 10) and computer strobe output coupling 54 is connected as a common line to one of the terminals of nor gates 206, 211, 213, and 215. To enable data word latch 202, the output of nor gate 206 must be driven high, i.e. both the computer strobe output coupling 54 and output line 306 of main decoder 201 must at some time both be low. To enable line 306, computer 4 provides on address code comprising a binary 6 (0110) to the input of 1 of 16 main decoder 201. The address code so applied, drives the 6th output (line 306) low. With line 306 low, data word latch 202 is enabled when computer strobe output coupling 54 goes low. Enabling data word latch 202 latches at the output lines 500, 501, 502 and 503 of line driver 204 the binary code 1001 (or nine) which is the desired number representing the location within a visual display module of the selected message. The code 1001, latched on the output lines 500, 501, 502 and 503 of line drive 204, is internally applied to the input of latch-drivers 220–244 and latch-decoder-drivers 250–276 which accordingly have also been identified as 500, 501, 502 and 503. (See FIGS. 11 and 13)

Referring to FIGS. 7–13, with the inputs of all latches latched at 1001, the latch-decoder-driver corresponding to the visual display module 61 must be addressed and strobed in order to visually display the appropriate message. Referring to Table 1, it is seen that visual display module 61, the ninth message of which is to be displayed, is driven by latch-decoder-driver 264. The address decoder 218 address for latch-decoder-driver 264 is 0010 which requires an address output from computer 4 of 1101, the binary inverse of 0010. The output of computer 4 is placed on output couplings 55, 56, 57 and 58 which are internally connected to the inputs of address decoder 218. It will be recalled that the data word 1001 is latched at the input of all latches and accordingly, 1001 appears on input lines 500, 501, 502, and 503 of latch-decoder-driver 264. The address 0010 of latch-decoder-driver 264 is inverted internally in computer 4 and is applied on lines 55, 56, 57 and 58 to address decoder 218. To complete the final step in displaying the message stored in position nine of visual display module 61, computer 4 generates an address code 1000 which is applied on computer output couplings 50, 51, 52 and 53 at the input of main decoder 201 which in turn activates output control line 308, thereby enabling decoder 218 at the next strobe signal appearing on computer output strobe coupling 54 (see FIGS. 9 and 12). As address decoder 218 is enabled, input line 602 of latch-decoder-driver 264, being activated, activates output line 909 (the ninth output corresponding to the data word 1001 appearing on input lines 500, 501, 502, and 503) thereby displaying the message stored at message storage location nine within visual display module 61.

As previously stated, the ninth message is extinguished by applying data work 1111 at lines 500, 501, 502 and 503 at the time latch-decoder-driver 264 is enabled.

With reference to FIG. 11, latch-drivers 220–230 are shown removed from their location in interface logic module 200 (FIG. 7) along with a schematic representation of visual display module 76 (FIG. 3). As previously stated latch-drivers 220–244 differ somewhat in their operation from latch-decoder-drivers 250–276. This difference allows the display of additional ordinary English messages on visual display modules 74–77 on which messages are already displayed. With reference to FIG. 11, it is thus possible, with the second, third and fourth messages of visual display module 76 displayed (the data word 0111 latched at the output of latch-driver 220), to display additional messages in that same module. To display the seventh message, that corresponding to line 814, the data word 0100 is applied to lines 500, 501, 502, and 503 of all latches including latch-drivers 220–230 shown in FIG. 11. Thereafter latch-driver 226 is addressed and enabled through address-decoder 216 thus displaying the message which is stored in the visual display module 76 message storage location corresponding to line 814.

Changing the data word applied to input 500, 501, 502, 503 and enabling latch-driver 226 has no effect on the data word 0111 latched on the output lines 801, 802, 803 and 804 of latch-driver 220 since latch-driver 220 has not been enabled.

From the foregoing discussion it will be apparent to those skilled in the art that any particular ordinary English message stored within one of the message storage locations of visual display modules 60–77 may be displayed by applying the appropriate address codes and data words at the input of interface logic module 200.

With reference to FIGS. 7 and 12, latch-driver 244 controls the display of decimal points provided in visual display modules 62, 63 and 64 which are driven respectfully by latch-decoder-drivers 262, 260 and 258. It will be noted that the input circuitry of latch-decoder-drivers 262, 260 and 258 differs somewhat from that of the remainder of the latch-decoder-drivers. In particular, the "common" line usually connecting two of the input terminals is replaced in latch-decoder-drivers 262, 260 and 258 by single input terminals respectively 940, 942 and 944. This alteration makes it possible to simultaneously display a selected message and a decimal point in visual display modules 62, 63 and 64. Latch-driver 244 unlike latch-drivers 220-242, is provided with reset line 601 and enable line 604.

To illustrate the decimal point display by example, if a decimal point is desired in visual display module 62 in addition to the message (presumably a numeric representation) already displayed, the data work 1000 is placed on the input lines 500, 501, 502 and 503 of latch-driver 244 in the manner previously described. Thereafter, the data word 0100 (numeric 4) is placed at the input of address decoder 218 which, when enabled in the manner previously described, drives output 604 high, latching on the output lines 940, 942, 944, 946 the data word 1000 which drives latch-decoder-driver 262 and accordingly the decimal display of visual display module 62. To extinguish the decimal point displayed in visual display module 62 the data word 0001 is placed at the input of address decoder 218 in the manner previously described and when enabled drives reset lines 601 low, resetting to 0 the output lines 940, 942, 944, 946 of latch-driver 244.

It will be apparent to those skilled in the art from the foregoing discussion that computer 4, through its control of address codes and data words placed on output couplings 50-53 and 55-58 and selective action of computer strobe coupling 54 enables computer 4 to control display of messages at selected addresses and the operation of interface logic module 200. In turn, the unskilled operator is given control over the computer by means of a selective operation of keys 121-144 of data terminal keyboard 120 (FIG. 4) and of mode switch 80 and reset button 82 of visual display front panel 2 (FIG. 3).

The system library of messages stored within visual display modules 60-77 includes, as previously stated, ordinary English messages describing machine instructions, messages which solicit data and messages which take the form of numbers. In addition, the system library includes a series of error messages. Natural system limits, such as for an N/C lathe, — the maximum length of a tool bed, or for and N/C machine tool, — the maximum allowable feed rate, may be programmed into the custom program developed for a given N/C machine. When predetermined limits are exceeded by the unskilled operator, data words and address codes corresponding to ordinary English messages describing the programming error are generated by the computer and the error message is displayed in the manner described for the display of other messages. To overcome a program error, it is necessary for the unskilled operator to eliminate the program error by correctly repeating previous steps in the program development. The present invention facilitates the occasional need for correcting improper operator responses by displaying instructions and numeric information for confirmation.

This feature of the present invention is illustrated in the exemplary program preparation below.

The particular manner in which the present invention achieves its stated objectives and the simplicity of N/C programming in accordance with the present invention are illustrated most clearly by the following example of the system operation.

Referring to FIGS. 5 and 6, workpiece 770 is illustrated as it might appear on a shop drawing prepared for use by an unskilled operator while generating a punched tape in accordance with the present invention.

As an example of the system operation, a program will be prepared for drilling hole 772 (FIG. 5). For purposes of the following examplary operation, assume that hole 772 is 3/16 inch in diameter and that the unskilled operator has been instructed to assign Tool No. 1 to the drill bit used and to reference all dimensions to coordinate (0,0) located at point 771 (FIG. 5). At each step, the message displayed is given along with the operator's response (key references to FIG. 4).

| Message Displayed: | Operator Response: |
|---|---|
| TOOL NO. 00 | NO |

(COMMENT: The operator rejects the displayed tool number because he desires to assign Tool No. 01 to the 3/16 inch drill bit.)

| Message Displayed: | Operator Response: |
|---|---|
| ENTER TOOL NO. | 2 ENTER |

(COMMENT: The operator depresses "2" (key 122) and thereafter depresses ENTER (key 132). The operator has assigned Tool No. 2 to the 3/16 drill bit.)

| Message Displayed: | Operator Response: |
|---|---|
| TOOL NO. 02 | NO |

(COMMENT: The result of the operators prior response is displayed at which time the operator realizes he has incorrectly assigned Tool No. 2 instead of Tool No. 1 to the 3/16 inch drill bit. The NO response irradicates the operators original entry and displays again the prior message.)

| Message Displayed: | Operator Response: |
|---|---|
| ENTER TOOL NO. | 1 ENTER |

(COMMENT: This is the correct Tool No. assignment.)

| Message Displayed: | Operator Response: |
|---|---|
| TOOL NO. 01 | YES |

(COMMENT: The operator's correct response is displayed and accepted.)

| Message Displayed: | Operator Response: |
|---|---|
| MILL? | NO |

(COMMENT: The operator wishes to DRILL not MILL and accordingly rejects the suggested machine operation.)

| Message Displayed: | Operator Response: |
|---|---|
| DRILL? | YES |

(COMMENT: This suggested machine operation is accepted since the operator desires to DRILL a hole.)

| Message Displayed: | Operator Response: |
|---|---|
| SPINDLE CW? | YES |

(COMMENT: The drilling operation requires a clockwise rotation of the spindle holding the drill bit.)

| Message Displayed: | Operator Response: |
|---|---|
| ARC? | NO |

(COMMENT: Unless the operator intends to drill holes on a bolt circle this suggested machine instruction is properly rejected.)

| Message Displayed: | Operator Response: |
|---|---|
| INCREM. 1 | 2 ENTER |
| PART REF. 2 | |

(COMMENT: The system is inquiring as to the origin of dimensions which will subsequently be entered. Since we have indicated point 771 as the (0,0) coordinate, dimensions should be referenced from that point which is a "part reference".)

| Message Displayed: | Operator Response: |
|---|---|
| PART REF. 2 | YES |

(COMMENT: The system is displaying the results of the operators[s previous response which, being correct, is accepted.)

| Message Displayed: | Operator Response: |
|---|---|
| TOOL BACK 2 | 2 ENTER |
| TOOL FRONT 4 | |

(COMMENT: The system inquires as to the direction the tool will move relative to part reference coordinate (0,0).)

| Message Displayed: | Operator Response: |
|---|---|
| TOOL BACK 2 | YES |

(COMMENT: The operators prior response is displayed and accepted.)

| Message Displayed: | Operator Response: |
|---|---|
| 00.000 | NO |

(COMMENT: The systems prior front-back dimension is displayed indicating it is presently at the (0,0) coordinate. Since the hole is not to be drilled at that location, the response is NO.)

| Message Displayed: | Operator Response: |
|---|---|

| -continued | |
|---|---|
| ENTER DIM. | ⅛, ⅛, ⅛, ⅛, ⅛, ENTER |

(COMMENT: The operator indicates by pressing "⅛" (key 140) five times that the hole location is five-eighths of an inch back from coordinate (0,0).)

| Message Displayed: | Operator Response: |
|---|---|
| 00.625 | YES |

(COMMENT: The dimension previously entered is displayed and, being correct, is accepted.)

| Message Displayed: | Operator Response: |
|---|---|
| TOOL LEFT 1 | 2 ENTER |
| TOOL RIGHT 3 | |

(COMMENT: The message displayed limits the operators's response to either 1 or 3. The operator has erroneously responded by entering 2.)

| Message Displayed: | Operator Response: |
|---|---|
| ILLEGAL | ADV. |

(COMMENT: The operator clears his error by depressing ADV. (key 143) which eradicates the prior incorrect response and displays again the prior message.)

| Message Displayed: | Operator Response: |
|---|---|
| TOOL LEFT 1 | 3 ENTER |
| TOOL RIGHT 3 | |

(COMMENT: Operator correctly responds).

| Message Displayed: | Operator Response: |
|---|---|
| TOOL RIGHT 3 | YES |

(COMMENT: Prior response is displayed and accepted.)

| Message Displayed: | Operator Response: |
|---|---|
| 00.000 | NO |

(COMMENT: The previous left-right dimension is displayed and rejected since the operator does not wish to drill the hole at part reference coordinates (0,5/8).)

| Message Displayed: | Operator Response: |
|---|---|
| ENTER DIM. | ¼, ¼, ¼, ENTER |

(COMMENT: The operator enters hole location 3/4 indicating the hole location is 3/4 inch to the right of part reference coordinate (0,5/8).)

| Message Displayed: | Operator Response: |
|---|---|

| | |
|---|---|
| -continued | |
| 00.750 | YES |

(COMMENT: The correct dimension is displayed and accepted.)

Having defined the operation as DRILL, assigned 3/16 inch drill bit to the TOOL NO. 01, and having positioned the bit at the coordinates (3/4, 5/8), the initial machine operations and movements are complete. For simplicity, numerous messages such as SPINDLE RPM and FEED RATE have been omitted in the foregoing example. The program continues suggesting a recording step.

| Message Displayed: | Operator Response: |
|---|---|
| RECORD ON TAPE? | YES |

(COMMENT: Having completed the first machine operations and movements the machine instructions and data are recorded on tape.)

| Message Displayed: | Operator Response: |
|---|---|
| PART COMPLETE? | NO |

(COMMENT: Since there are other holes to be drilled (see FIG. 5), the part is indicated as not complete.)

By proceeding through steps similar to the foregoing for each machining operation and movement a complete N/C program for controlling repetitive production of workpiece 770 (FIGS. 5 & 6) may be generated by a relatively unskilled operator.

It will be apparent to those skilled in the art that, while the tape preparation system comprising the present invention is operationally independant of any direct coupling to the N/C device for which each punched tape is generated, the tape preparation system of the present invention could nevertheless be coupled directly to an N/C device and operated as a direct controller while at the same time preparing a punched tape.

It will of course be appreciated by those skilled in the art that the present invention is not limited to the precise embodiment disclosed. For example, various changes, alterations or modifications may be made in the system including in the interface logic module design, visual display front panel, placement, display means and position or in the data terminal input/output system without departing from the scope and spirit of the present invention.

We claim:

1. A tape preparation system for preparing tapes of the type used in controlling the operation of numerically controlled devices, said tape preparation system comprising;
   Illuminating visual display means;
   said illuminating visual display means comprises;
   storage means for storing messages descriptive of machine instructions and conditions in ordinary English
   at least one display window;
   display means for illuminating messages stored within said storage means on said at least one display window;
   computer means;
   input means for operator entry of information and data into said computer means;
   interface means connected to said computer means between said illuminating visual display means and said input means, said interface means for decoding signals generated by said computer means and controlling the operation of said illuminating visual display means and said input means;
   recording means for recording certain of said signals generated by said computer means.

2. A tape preparation system as claimed in claim 1 wherein said computer means comprises:
   processor means, said processor means generating primary coded signals representative of machine operations and movements, said processor means generating secondary coded signals representative of said primary coded signals;
   storage means for holding certain of said primary coded signals;
   input means for entering coded signals representative of information and data for presentation to said processor means;
   output means for transmitting said primary coded signals and said secondary coded signals from said processor means and from said storage means.

3. A tape preparation system as claimed in claim 1 wherein said input means comprises:
   console means having a multiplicity of manually operable keys, said keys representative of ordinary English information and data appropriate for entry into said computer means;
   encoder means connected to said console means, said encoder means for coding information and data entered on said manually operable keys, said encoder means further for encoding signals from said computer means prior to entry thereof on said recording means.

4. A tape preparation system as claimed in claim 1 wherein said interface means comprises:
   input lines for receiving signals generated by said computer means;
   decoder means connected to certain of said input lines for decoding signals received at said certain of said input lines thereby selectively identifying for operation said input means, said interface means, said recording means and said illuminating visual display means;
   address means connected to others of said input lines and to said decoder means, said address means providing signals to selectively control the operation of said illuminating visual display means in response to certain of said decoded signals from said decoder means.
   output means for driving said illuminating visual display means and for carrying signals between said computer and said input means in response to others of said decoded signals from said decoder means.

5. A tape preparation system for preparing tapes of the type used for controlling the operation of numerically controlled devices comprising:
   illuminating visual display means for storing and selectively illuminating a multiplicity of messages descriptive of machine operations and conditions;
   computer means for generating coded signals corresponding to the location of messages stored within said illuminating visual display means;

input means having a manually operable keyboard and an encoder, said keyboard for operator entry of data and information responsive to messages illustrated by said illuminating visual display means into said computer means, said encoder for encoding operator entered data and information;

interface means connected to said computer means between said illuminating visual display means and said input means, said interface means decoding certain of said coded signals generated by said computer means to thereby selectively identify for illumination, in accordance with said decoded signals, messages stored within said illuminating visual display means; said interface means decoding others of said coded signals generated by said computer means to thereby selectively cause the transfer of coded signals between said input means and said computer means;

recording means for recording signals definitive of machine operations and conditions.

6. A tape preparation system as claimed in claim 5 wherein said illuminating visual display means comprises:
storage means for storing a multiplicity of messages;
at least one display window;
illuminating means for illuminating messages identified by said interface means on said at least one display window.

7. A tape preparation system as claimed in claim 5 wherein said computer means comprises:
a general purpose digital computer, said general purpose digital computer comparing program signals internally generated to data and information entered on said keyboard of said input means and generated primary code signals and secondary code signals based on said comparison; said primary code signals definitive of machine operations and conditions, said secondary code signals definitive of the storage location in said illuminating visual display means of messages describing machine operations and conditions defined by said primary code signals;
memory means for storing primary code signals;
input means for receiving operator entered data and information from said keyboard of said input means for comparison in said general purpose digital computer; and
output means for transmitting coded information definitive of machine operations and conditions stored in said memory means to said recording means.

8. A tape preparation system as claimed in claim 5 wherein said interface means comprises;
decoder means connected to said computer means for receiving and decoding address code signals generated by said computer means;
latch means connected to said computer means for receiving, decoding and latching location code signals identifying the locations of messages stored within said illuminating visual display means;
address means connected between said decoder means and said latch means for enabling said latch means in response to signals from said decoder means;
drive means connected to said latch means, said drive means causing said illuminating visual display means to illuminate messages stored at the locations identified by said decoded location code signals latched by said latch means.

9. A tape preparation system as claimed in claim 5 wherein said input means comprises;
a keyboard with keys bearing self explanatory indicia representative of data and information for responding to messages illuminated by said illuminating visual display means; and
encoding means for generating code signals corresponding to certain of said keys of said keyboard; and
drive means for driving said recording means in response to signals from said interface means.

10. A tape preparation system for use in combination with a conventionally programmed computer of the type used to control numerically controlled devices, said tape preparation system comprising:
illuminating visual display means for storing and illuminating messages for operator visual inspection in response to selected code signals;
computer coupling means;
input means for receiving and coding operator entered data and information and for presenting said coded operator entered information at said computer coupling means;
interface means connected between said visual display means and said input means to said computer through said computer coupling means, said interface means for receiving data words and address codes and generating therefrom selected code signals to control the operation of said input means and said visual display means;
recording means for selectively recording coded machine signals generated internally by said computer in response to certain of said selected code signals thereby forming a record of said coded machine signals.

11. A tape preparation system as claimed in claim 10 wherein said illuminating visual display means comprises:
storage means for storing illuminably displayable messages descriptive of machine instructions and conditions;
window means for viewing;
illuminating means for selectively illuminating said illuminably displayable messages in response to certain of said selected code signals.

12. A tape preparation system as claimed in claim 10 wherein said computer coupling means comprises:
data word lines for carrying data words representative of certain of said coded machine signals;
address code lines for carrying address codes representative of others of said coded machine signals;
power lines for carrying operating electrical power;
strobe lines for carrying a strobe signal;
input lines for carrying said coded operator entered information from said input means to said computer coupling means;
output lines for carrying coded machine signals from said computer coupling lines to said recording means for entry on said record.

13. A tape preparation system as claimed in claim 10 wherein said input means comprises:
a console having a multiplicity of manually operable keys for receiving operator entered data and information;
an encoder operably connected to said multiplicity of manually operable keys for coding said operator entered information, said encoder means further for coding signals from said computer coupling means prior to entry thereof on said recording means;

coupling lines for coupling said coded operator entered information to said computer coupling means and for coupling said coded machine signals to said recording means.

14. An interface means for a tape preparation system having computer coupling means, input means and illuminating visual display means, said interface means comprising:

input lines for receiving from said computer coupling means data words, address codes and strobe signals;

main decoder means having address input lines and address output lines, said address input lines for receiving said address codes from said input lines, said main decoder means for decoding said address codes and enabling a selected one of said address output lines;

data word latch-driver means having data input lines and data output lines, said data input lines for receiving said data words and said strobe signals from said input lines and for receiving a signal from a selected one of said address output lines of said main decoder means, said data word-latch drive means for decoding said data words and presenting for each of said decoded data words a data word definitive of a storage location within said illuminating visual display means at said data output lines;

transfer means connected between said computer coupling means and said input means for transferring coded information between said computer coupling means and said input means in response to a signal from a selected one of said address output lines of said main decoder means;

first and second secondary decoder means for decoding said data words in response to one of said strobe signals and a signal from a selected one of said address output lines of said main decoder means;

secondary latch-driver means for latching a coded signal determined by said data output lines of said data word latch-driver means and driving the illumination of a selected message stored within said illuminating visual display means in accordance with the output of said first secondary decoder means;

latch-decoder-driver means for decoding and latching a coded signal determined by said data output lines of said data word latch-driver means and driving the illumination of a selected message stored within said illuminating visual display means in accordance with the output of said second secondary decoder means.

15. A tape preparation system for use in combination with a conventionally programmed computer of the type used to control numerically controlled devices, said tape preparation system comprising;

illuminating visual display means for storing and illuminating a multiplicity of messages descriptive of machine operations and conditions in response to coded signals;

computer coupling means for receiving coded signals corresponding to the location of selected messages stored within said illuminating visual display means;

input means having a manually operable keyboard, and an encoder, said keyboard for receiving operator entered data and information, said encoder for encoding operator entered data and information;

interface means connected between said illuminating visual display means and said input means to said computer coupling means, said interface means decoding certain of said coded signals received by said computer coupling means thereby identifying and controlling the illumination of selected messages stored within said illuminating visual display means in accordance with said decoded signals; said interface means decoding others of said coded signals received by said computer coupling means, thereby identifying for operation certain of said computer coupling means for causing the transfer of information between said input means and said computer;

recording means for recording signals definitive of machine operations and conditions.

16. A tape preparation system as claimed in claim 15 wherein said illuminating visual display means comprises:

an upper portion having fourteen illuminating display modules, each having twelve message storage locations, each of said message storage locations having a coded address, said illuminating display module having a window means and an illuminating means such that one of said addressed locations is illuminated in response to a coded signal corresponding to said addressed location;

a lower portion having four illuminating display modules, each having twelve message storage locations, each message storage location having a coded address, said illuminating display modules having a window means and an illuminating means such that one or more of said stored messages are illuminated in response to a signal including the coded address of said one or more messages.

17. A tape preparation system as claimed in claim 15 wherein said computer coupling means comprises:

data word lines for carrying data words representative of certain of said coded signals;

address code lines for carrying address codes representative of others of said coded signals;

power lines for carrying operating electrical power;

strobe lines for carrying strobe signals;

input lines for carrying said operator entered data and information from said input means to said computer coupling means;

output lines for carrying coded signals from said computer coupling lines to said recording means for entering on said record.

18. An interface means for a tape preparation system having computer coupling means, input means and illuminating visual display means, said interface means comprising:

input lines for receiving from said computer coupling means four-bit data words, four-bit address codes and strobe signals;

main decoder means having four address input lines and a plurality of address output lines, said four address input lines for receiving said four-bit address codes and said strobe signals from said input lines, said main decoder means for decoding said four-bit address codes and enabling a selected one of said plurality of address output lines;

data word latch-driver means having four data input lines, two enable lines and a plurality of data output lines, said four data input lines for receiving said four-bit data words and said two enable lines for receiving said strobe signals from said input lines and for receiving a signal from a selected one of said plurality of address output lines of said main decoder means, said data data word latch-driver means for decoding said four-bit data words and presenting a data word definitive of a storage location within said illuminating visual display means at said plurality of data output lines;

transfer means connected between said computer coupling means and said input means for transferring coded information between said computer coupling means and said input means in response to a signal from a selected one of said plurality of address output lines of said main decoder means;

first and second secondary decoder means for decoding said four-bit data words in response to one of said strobe signals and a signal from a selected one of said plurality of address output lines of said main decoder means;

secondary latch-driver means for latching a coded signal determined by said plurality of data output lines of said data word latch-driver means and driving the illumination of a selected message stored within said illuminating visual display means in accordance with the output of said first secondary decoder means;

latch-decoder-driver means for decoding and latching a coded signal determined by said plurality of data output lines of said data word latch-driver means and driving the illumination of a selected message stored within said illuminating visual display means in accordance with the output of said second secondary decoder means.

19. A tape preparation system as claimed in claim 15 wherein said input means comprises:
a keyboard with keys bearing self-explanatory indicia representative of data and information for operator response to messages illuminated by said illuminating visual display means;
inputting means for generating code signals corresponding to said data and information entered through said keyboard;
drive means for driving said recording means in response to signals from said interface means.

20. An interface means for interfacing a computer means, an input means and an illuminating visual display means having a plurality of message storage location, and a recorder means to form a tape preparation system, said interface means comprises:
input lines for receiving from said computer means data words, address codes and strobe signals;
main decoder means having address input lines and address output lines, said address input lines for receiving said address codes and said strobe signals from said input lines, said main decoder means for decoding said address codes and enabling a selected one of said address output lines;
data word latch-driver means having data input lines and data output lines, said data input lines for receiving said data words and said strobe signals from said input lines and for receiving a signal from a selected one of said address output lines of said main decoder means, said data word-latch driver means for decoding said data word and presenting a data word definitive of a storage location within said illuminating visual display means at said data output lines;
transfer means connected between said computer means and said input means for transferring coded information between said computer means and said input means in response to a signal from a selected one of said address output lines of said main decoder;
first and second secondary decoder means for decoding said data words in response to one of said strobe signals and a signal from a selected one of said address output lines of said main decoder;
secondary latch-driver means for latching a coded signal determined by said data output lines of said data word latch-driver means and driving the illumination of a selected message stored within said illuminating visual display means in accordance with the output of said first secondary decoder means;
latch-decoder-driver means for decoding and latching a coded signal determined by said data output lines of said second secondary decoder means and driving the illumination of a selected message stored within said illuminating visual display means in accordance with the output of said second secondary decoder means.

21. An interface means for interfacing a computer means, an input means and an illuminating visual display means having a plurality of message storage locations, and a recorder means to form a tape preparation system, said interface means comprising;
input lines for receiving from said computer means four-bit data words, four-bit address codes and strobe signals;
main decoder means having four address input lines and a plurality of address output lines, and four address input lines receiving said four-bit address codes and said strobe signals from said input lines, said main decoder means decoding said four-bit address codes and enabling a selected one of said plurality of address output lines;
data word latch-driver means having four data input lines, two enable lines and a plurality of data output lines, said four data input lines receiving said four-bit data words and said two enable lines receiving said strobe signals from said input lines and receiving a signal from a selected one of said plurality of address output lines of said main decoder means, said data word latch-driver means for decoding said four-bit data words and presenting a data word definitive of a storage location within said illuminating visual display means at said plurality of data output lines;
transfer means connected between said computer means and said input means for transferring coded information between said computer means and said input means in response to a signal from a selected one of said plurality of address output lines of said main decoder means;
first and second secondary decoder means for decoding said four-bit data words in response to one of said strobe signals and a signal from a selected one of said plurality of address output lines of said main decoder means;

secondary latch-driver means for latching a coded signal determined by said plurality of data output lines of said data word latch-driver means and driving the illumination of a selected message stored within said illuminating visual display means in accordance with the output of said first secondary decoder means;

latch-decoder-driver means for decoding and latching a coded signal determined by said plurality of data output lines of said data word latch-driver means and driving the illumination of a selected message stored within said illuminating visual display means in accordance with the output of said second secondary decoder means.

* * * * *